United States Patent [19]

Manska

[11] 4,146,010
[45] Mar. 27, 1979

[54] OUTDOOR GRILL TRIPOD

[76] Inventor: Jack H. Manska, 306 Fairfield Rd., Fayetteville, N.C. 28303

[21] Appl. No.: 773,808

[22] Filed: Mar. 3, 1977

[51] Int. Cl.² .......................... A47J 37/04; F24B 3/00
[52] U.S. Cl. ...................................... 126/30; 126/9 R; 27/107
[58] Field of Search ............... 126/9 R, 29, 30, 25 A, 126/25 R, 304, 306; 248/168, 431; D7/107, 108, 109, 110

[56] References Cited

U.S. PATENT DOCUMENTS

| D. 196,019 | 8/1963 | Mayer | D7/108 |
|---|---|---|---|
| 366,833 | 7/1887 | Hipwell | 248/431 |
| 911,544 | 2/1909 | Roehlk et al. | 248/168 |
| 1,322,256 | 11/1919 | Makos | 248/168 X |
| 1,412,377 | 4/1922 | Suffa et al. | 248/168 |
| 1,666,293 | 4/1928 | Lorton | 126/30 X |
| 2,466,496 | 4/1949 | Smith | 126/30 X |
| 3,043,209 | 7/1962 | Sutherland et al. | D7/107 |
| 3,719,181 | 3/1973 | Porter, Jr. | 126/30 |
| 4,043,260 | 8/1977 | LaPour et al. | 126/30 X |

OTHER PUBLICATIONS

Better Homes and Gardens, Jun., 1958, p. 72.

Primary Examiner—William E. Wayner
Assistant Examiner—Harold Joyce

[57] ABSTRACT

A portable barbeque and cooking appliance that includes a tripod and a plurality of suspending members depending from the tripod for supporting a rack or a cooking vessel.

1 Claim, 3 Drawing Figures

OUTDOOR GRILL TRIPOD

BACKGROUND OF THE INVENTION

This invention relates to a portable barbeque appliance; more particularly, to a tripod arrangement that will sturdily support a grill or cooking vessel therebetween.

The prior art teaches a variety of cooking appliances for use outdoors, for example, as disclosed in U.S. Pat. Nos. 163,202; 192,011; 279,238; 955,140; 3,045,660; 3,152,536; 3,455,291; 3,837,328; 3,946,653; and others.

SUMMARY OF THE INVENTION

It is accordingly an object of the instant invention to provide for a new and improved outdoor, portable barbeque appliance.

It is another object to provide for one having the attributes as aforedescribed.

It is a further object to provide for the same at relatively little cost thereby making the same generally available.

These and other objects and advantages of the invention will become more apparent from a consideration of the following detailed disclosure and claims and by reference to the accompanying drawings, in which:

Figure 1:
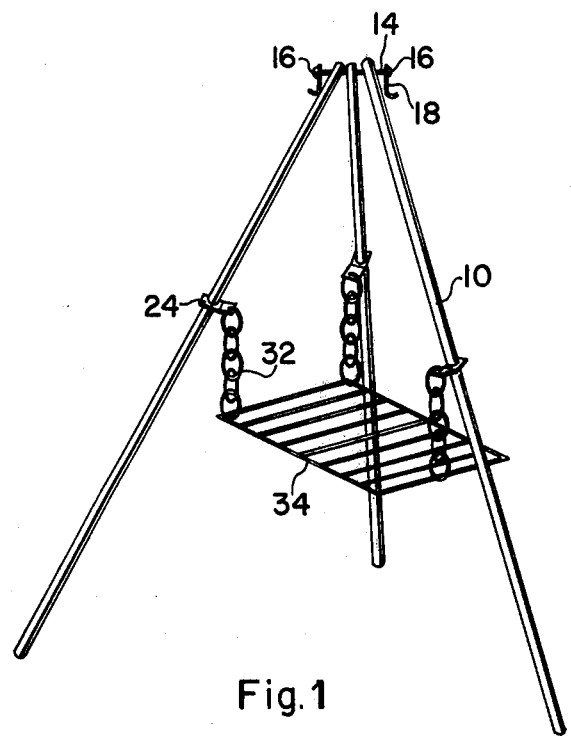
FIG. 1 is a perspective view of the appliance.
Figure 2:
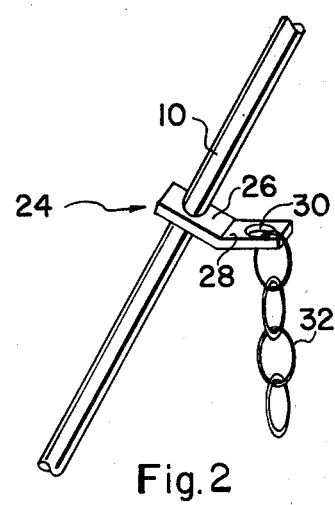
FIG. 2 is a perspective view of a portion of the appliance.
Figure 3:
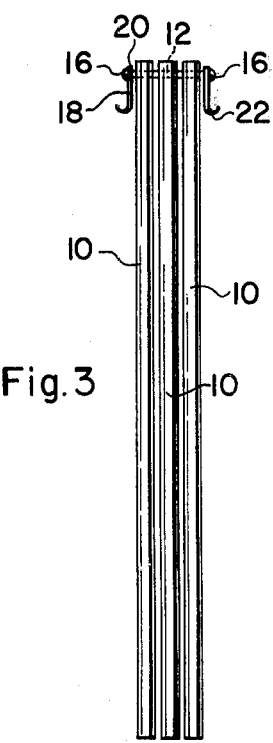
FIG. 3 is a side elevational view of the tripod in the collapsed position.

Broadly speaking, the instant invention includes the provision of a portable, collapsible outdoor cooking appliance, comprising three elongated members of equal length joined at a common distal end and forming a tripod, each of the members defining a first aperture adjacent the destal end, the apertures being in axial alignment when the members are vertically aligned in parallel relation, a pin member having enlarged destal ends communicating between the members through the first apertures, a pair of J-shaped cam locks each defining a second aperture each member of the pair disposed between an elongated member and the enlarged destal ends, the J-shaped cam locks being adapted to arrest the movement of the elongated members when the same are spread apart to form the tripod, three vessel support members, each having two converging planes, a first plane thereof defining a third aperture communicating with the elongated member whereby the vessel support member is slidably movable along the elongated member, a second plane thereof defining a fourth aperture, tether support means engaging the second plane through the fourth aperture, the tether support means operative to engage and support a cooking vessel therefrom between the elongated members.

DETAILED DISCLOSURE

Referring more particularly to the drawings there is shown an outdoor cooking appliance that includes three elongated rigid members 10 that are preferably tubular for least weight. The three members 10 are of equal length and each defines an aperture 12 adjacent one destal end thereof, when the three members are vertically disposed, in parallel, the three apertures are axially aligned. A pin member 14 communicates between the three members 10 through the apertures 12. The pin member 14 preferably has an enlarged portion 16 at both destal ends to prevent the same from being disengaged from the mating engagement with the apertures. A pair of cam locks 18 are disposed, one each, between an outer member 10 and the portion 16 of the pin 14. The lock 18 is generally a flat J-shaped member that defines an aperture in its long portion 20, the pin 14 engaging the aperture, while the short (arcuate) portion 22 is disposed below the pin 14 and hooked outwardly away from the member 10, the long end of the lock 18 being in substantial planar alignment with the destal ends of the members 10 engaging the pin 14. The foregoing arrangement allows the three members 10 to spread apart for a distance certain determined by the length of the pin 14 while the same is maintained stable by the cam lock 18, the arcuate portion 22 thereof arresting the members 10.

Three suspension locks 24 are provided. Each one formed of a member that has two converging planes 26, 28, each plane defining an aperture therein. The first aperture on the first plane 26 having an internal diameter that is larger than the external diameter of the member 10, the opposing plane 28 defining a second aperture 30. The lock 24 being adapted to slidably move up and down upon the length of the member 10, its movement thereof being arrested by the angular disposition of the lock 24 by virtue of the converging planes 24, 26. A length of support material 32 such as a link chain or the like engages the second plane 26 through the second aperture 30 for supporting a cooking vessel 34, i.e., rack, pot, etc. When the vessel 34 is supported by the tether material 32, the locks 24 are pulled upward and frictionally engage the member 10 in a stationary position.

Since it is obvious that numerous changes and modifications can be made in the above-described details without departing from the spirit and nature of the invention it is to be understood that all such changes and modifications are included within the scope of the invention.

I claim:

1. A portable, collapsible outdoor cooking appliance, comprising three elongated members of equal length joined at a common distal end and forming a tripod, each of said members defining a first aperture adjacent the distal end, said first aperture in each of said elongated members being in axial alignment when said members are vertically aligned in parallel relation, a pin member having enlarged distal ends communicating with said apertures for pivotably joining the three elongated members at said common distal end, a plurality of adjustable suspension means, each of said adjustable means having first and second converging planes, the first plane defining a second aperture therein for releasible frictionally engaging an associated elongated member, the second plane thereof defining a third aperture for suspending one end of a flexible member therefrom, the other end of the flexible member being attached to a grill, whereby each said suspension means slides on its associates elongated members to maintain the grill in a horizontal plane while adjusting the height of the grill.

* * * * *